US007994101B2

(12) United States Patent
Cassidy et al.

(10) Patent No.: US 7,994,101 B2
(45) Date of Patent: *Aug. 9, 2011

(54) CORROSION INHIBITOR INTENSIFIER COMPOSITIONS AND ASSOCIATED METHODS

(75) Inventors: Juanita M. Cassidy, Duncan, OK (US); Chad E. Kiser, Comanche, OK (US); Jim L. Lane, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 815 days.

This patent is subject to a terminal disclaimer.

(21) Appl. No.: 11/638,190

(22) Filed: Dec. 12, 2006

(65) Prior Publication Data

US 2008/0139414 A1 Jun. 12, 2008

(51) Int. Cl.
*C09K 8/60* (2006.01)

(52) U.S. Cl. ........ 507/237; 507/235; 507/263; 507/266; 507/267; 507/268

(58) Field of Classification Search .................. None
See application file for complete search history.

(56) References Cited

U.S. PATENT DOCUMENTS

| | | | |
|---|---|---|---|
| 2,038,316 A | 4/1936 | Rosenstein | 71/1 |
| 2,456,947 A | 12/1948 | Jernstedt. | 148/254 |
| 3,094,490 A | 6/1963 | Gardner et al. | 252/149 |
| 3,124,534 A | 3/1964 | O'Brien et al. | 510/253 |
| 3,193,506 A | 7/1965 | Joo et al. | |
| 3,240,714 A | 3/1966 | Charanjit Rai | |
| 3,416,974 A * | 12/1968 | Scott | 148/250 |
| 3,589,860 A | 6/1971 | Foroulis | 21/2.7 |
| 3,627,043 A * | 12/1971 | Brown | 166/325 |
| 3,664,807 A * | 5/1972 | Redmore | 422/7 |
| 3,887,488 A * | 6/1975 | Scott et al. | 252/389.2 |
| 3,908,759 A * | 9/1975 | Cagle et al. | 166/117.6 |
| 3,935,289 A | 1/1976 | De Radzitzky d'Ostrowick et al. | |
| 4,138,148 A * | 2/1979 | Zaremba | 285/317 |
| 4,448,710 A * | 5/1984 | Hort et al. | 252/390 |
| 4,522,658 A * | 6/1985 | Walker | 148/248 |
| 4,539,122 A | 9/1985 | Son et al. | 252/8.55 |
| 4,552,672 A | 11/1985 | Walker et al. | 507/240 |
| 4,616,719 A * | 10/1986 | Dismukes | 175/94 |
| 4,640,786 A | 2/1987 | Soderquist et al. | 507/237 |
| 4,710,074 A * | 12/1987 | Springer | 408/200 |
| 4,732,259 A | 3/1988 | Yu et al. | 198/365 |
| 4,734,259 A | 3/1988 | Frenier et al. | 422/16 |
| 4,790,958 A * | 12/1988 | Teot | 507/240 |
| 4,871,023 A * | 10/1989 | Nigrini et al. | 166/252.3 |
| 4,980,074 A * | 12/1990 | Henson et al. | 507/245 |
| 5,002,673 A | 3/1991 | Williams et al. | 507/240 |
| 5,120,471 A | 6/1992 | Jasinski et al. | 252/389.54 |
| 5,366,643 A | 11/1994 | Walker | 507/247 |
| 5,441,929 A | 8/1995 | Walker | 507/260 |
| 5,566,760 A | 10/1996 | Harris | 166/308.6 |
| 5,591,381 A | 1/1997 | Walker | 252/389.54 |
| 5,697,443 A | 12/1997 | Brezinski et al. | 166/307 |
| 5,763,368 A | 6/1998 | Brezinski | 507/240 |
| 5,976,416 A | 11/1999 | Brezinski | 252/389.62 |
| 6,056,896 A | 5/2000 | Brezinski | 252/394 |
| 6,068,056 A | 5/2000 | Frenier et al. | |
| 6,117,364 A | 9/2000 | Vorderbruggen et al. | 252/395 |
| 6,180,057 B1 | 1/2001 | Taylor et al. | |
| 6,192,987 B1 | 2/2001 | Funkhouser et al. | |
| 6,365,067 B1 | 4/2002 | Ahn et al. | 252/389.23 |
| 6,399,547 B1 * | 6/2002 | Frenier et al. | 507/268 |
| 6,624,263 B2 | 9/2003 | Matyjaszewski et al. | 526/90 |
| 7,073,588 B2 | 7/2006 | Cassidy et al. | |
| 7,163,056 B2 | 1/2007 | Cassidy et al. | |
| 7,216,710 B2 | 5/2007 | Welton et al. | |
| 2005/0121114 A1 | 6/2005 | Gonzalez et al. | |
| 2006/0243449 A1 | 11/2006 | Welton et al. | |
| 2007/0010404 A1 | 1/2007 | Welton et al. | |
| 2007/0071887 A1 | 3/2007 | Cassidy et al. | |

FOREIGN PATENT DOCUMENTS

| | | |
|---|---|---|
| EP | 0569884 A1 | 5/1992 |
| EP | 0548018 A1 | 12/1992 |
| EP | 593230 A1 * | 4/1994 |
| EP | 1724375 A2 | 11/2006 |
| EP | 1724375 A3 | 11/2006 |
| GB | 1307727 A | 2/1973 |
| GB | 2405421 A | 4/2004 |
| WO | 01/79590 A2 | 4/2001 |
| WO | 01/79590 A3 | 10/2001 |
| WO | 02/103081 A2 | 12/2002 |
| WO | 02/103081 A3 | 12/2002 |
| WO | 2006/136262 A1 | 12/2006 |

OTHER PUBLICATIONS

XP-002499108 entitled Organische Verbindungen Einiger Nichtmetalle, by Beyer, H.; Walter, W. (pp. 166-169), 1981.

Troquet, M., et al.: "The Mechanism of the Inhibition of Zinc Corrosion in 1N NCl Solution by Tetraphenylphosphonium Bromide" vol. 21, No. 2, 1981.

International Search Report and Written Opinion of International Application No. PCT/GB2007/004708, Oct. 12, 2007.

Krzysztof Matyjaszewslci, et al.; "Controlled/"Living"Radical Polymerization of Styrene and Methyl Methacrylate Catalyzed by Iron Complexes", Macromolecules, 30, 8161, 1997.

(Continued)

*Primary Examiner* — John J Figueroa

(74) *Attorney, Agent, or Firm* — Robert A. Kent; McDermott Will & Emery LLP

(57) ABSTRACT

Many methods are presented herein including a method comprising: providing a metal surface; and contacting the metal surface with a treatment fluid comprising an aqueous base fluid, an acid, a corrosion inhibitor, and a corrosion inhibitor intensifier composition comprising a corrosion inhibitor compound that corresponds to a formula: PR1R2R3, wherein R1, R2, and R3 are chosen from the group consisting of $C_1$-$C_{20}$ alkyl, cycloalkyl, oxyalkyl, and aryl groups, and R1, R2, and R3 may or may not be equal. Corrosion inhibitor intensifier compositions also are provided.

19 Claims, No Drawings

OTHER PUBLICATIONS

"Krzysztof Matyjaszewski, et al.; "Controlled/"Living" Radical Polymerization. Kinetics of the Homogeneous Atom Transfer Radical Polymerization of Styrene; J. Am Chem. Soc., 119, 674, 1997.

Yasuhiro Watanabe, et al.; "Ru(Cp*)Cl (PPh3)2: A Versatile Catalyst for Living Radical Polymerization of Methacrylates, Acrylates, and Styrene", Macromolecules, 34, 4370, 2001.

Tsuyoshi Ando, et al.; "Iron(II) Chloride Complex for Living Radical Polymerization of Methyl Methacrylate", Macromolecules, 30, 4507, 1997.

Jin-Shan Wang, et al.; "Controlled/"Living"Radical Polymerization. Atom Transfer Radical Polymerization in the Presence of Transition-Metal Complexes" J. Am. Chem. Soc., 117, 5614, 1995.

Jin-Shan Wand, et al.; "Controlled/"Living"Radical Polymerization. Halogen Atom Transfer Radical Polymerization Promoted by a Cu(I)/Cu(II) Redox Process"; Macromolecules, 28, 7901, 1995.

Boffardi, Bennett P. "Control of Environmental Variables in Water-Recirculating Systems." Metals Handbook, Ninth Edition, vol. 13 Corrosion. pp. 487-497, 1987.

Masaru Ihara et al., "The Inhibition of Iron Corrosion in Acid Solutions Using Bismuth(III) Chloride," vol. 33, No. 8, pp. 1267-1279 (1992), Aug. 1992.

T. Hayashi et al., "The Inhibition Effect of Bismuth(III) Compounds on the Corrosion of Iron in 1 N HCl at Elevated Temperatures," vol. 38, No. 6, pp. 867-879 (1996). Jun. 1996.

Halliburton brochure entitled "HAI-404M Corrosion Inhibitor," dated Feb. 2007.

Halliburton brochure entitled "HAI-85M Acid-Corrosion Inhibitor," dated Oct. 2007.

BASF, "Golpanol® PAP," dated, Apr. 2000.

International Search Report and Written Opinion on PCT/GB2008/003936 dated Nov. 25, 2008.

Notice of Allowance for U.S. Appl. No. 12/001842, dated Jan. 13, 2010.

* cited by examiner

CORROSION INHIBITOR INTENSIFIER COMPOSITIONS AND ASSOCIATED METHODS

BACKGROUND

The present invention relates to methods and compositions for treating subterranean formations. More particularly, the present invention relates to corrosion inhibitor intensifier compositions that may be useful, inter alia, for enhancing the inhibition of metal corrosion in acidic environments, especially those encountered in subterranean operations such as hydrocarbon recovery, and associated methods of use.

Acidic fluids may be present in a multitude of operations in the oil and chemical industries. In these operations, metal surfaces in piping, tubing, heat exchangers, and reactors may be exposed to acidic fluids. Acidic fluids are often used as a treating fluid in wells penetrating subterranean formations. Such acidic treatment fluids may be used in, for example, clean-up operations or stimulation operations for oil and gas wells. Acidic stimulation operations may use these treatment fluids in hydraulic fracturing and matrix acidizing treatments. As used herein, the term "treatment fluid" refers to any fluid that may be used in an application in conjunction with a desired function and/or for a desired purpose. The term "treatment" does not imply any particular action by the fluid or any component thereof.

Acidizing and fracturing treatments using aqueous acidic treatment fluids commonly are carried out in hydrocarbon-containing subterranean formations penetrated by a well bore to accomplish a number of purposes, one of which is to increase the permeability of the formation. The increase in formation permeability normally results in an increase in the recovery of hydrocarbons from the formation. In acidizing treatments, generally aqueous acidic solutions are introduced into the subterranean formation under pressure so that the acidic solution flows into the pore spaces of the formation. The acidic solution reacts with acid-soluble materials contained in the formation which results in an increase in the size of the pore spaces and an increase in the permeability of the formation. In fracture-acidizing treatments, one or more fractures are produced in the formation and the acidic solution is introduced into the fracture to etch flow channels in the fracture face. The acid also enlarges the pore spaces in the fracture face and in the formation.

The rate at which acidizing fluids react with reactive materials in the subterranean formation is a function of various factors including but not limited to acid concentration, temperature, fluid velocity and the type of reactive material encountered. Whatever the rate of reaction of the acidic solution, the solution can be introduced into the formation only a certain distance before it becomes spent. It is desirable to maintain the acidic solution in a reactive condition for as long a period of time as possible to maximize the permeability enhancement produced by the acidic solution.

A common problem associated with using acidic treatment fluids in subterranean formations is the corrosion of the tubular goods in the well bore and the other equipment used to carry out the treatment. The expense of repairing or replacing corrosion damaged equipment is high. The corrosion problem may be exacerbated by the elevated temperatures encountered in deeper formations. The increased corrosion rate of the ferrous and other metals making up the tubular goods and other equipment results in quantities of the acidic solution being neutralized before it ever enters the subterranean formation. The partial neutralization of the acid results in the production of quantities of metal ions which are highly undesirable in the subterranean formation. Acidic treatment fluids may include a variety of acids such as, for example, hydrochloric acid, formic acid, hydrofluoric acid, and the like. While acidic treatment fluids may be useful for a variety of downhole operations, acidic treatment fluids can be problematic in that they can cause corrosion to downhole production tubing, downhole tools, and other surfaces in a subterranean formation.

As used herein, the term "corrosion" refers to any reaction between a material and its environment that causes some deterioration of the material or its properties. Examples of common types of corrosion include, but are not limited to, the rusting of metal, the dissolution of a metal in an acidic solution, and patina development on the surface of a metal. As used herein, the term "inhibit" and its derivatives refer to lessening the tendency of a phenomenon to occur and/or the degree to which that phenomenon occurs. The term "inhibit" does not imply any particular degree or amount of inhibition.

To combat potential corrosion problems, an assortment of corrosion inhibitors has been used to reduce or prevent corrosion to downhole metals and metal alloys with varying levels of success. A difficulty encountered with the use of some corrosion inhibitors is the limited temperature range over which they may function effectively. For instance, certain conventional antimony-based inhibitor formulations have been limited to temperatures above 270° F. and do not appear to function effectively below this temperature.

Another drawback of some conventional corrosion inhibitors is that certain corrosion inhibitors' components may not be compatible with the environmental standards in some regions of the world. For example, quaternary ammonium compounds and "Mannich" condensation compounds have been used as corrosion inhibitors. However, these compounds generally are not acceptable under stricter environmental regulations, such as those applicable in the North Sea region or other regions. Consequently, operators in some regions may be forced to suffer increased corrosion problems, resort to using corrosion inhibitor formulations that may be less effective, or forego the use of certain acidic treatment fluids entirely.

Sometimes corrosion inhibitor intensifiers may be used to extend the performance range of a selected acid corrosion inhibitor. The term "intensifier" as used herein refers to compounds that are capable of enhancing the performance of a selected acid corrosion inhibitor. Unfortunately, most intensifiers do not perform universally with all corrosion inhibitors and many have temperature, time, and environmental drawbacks. For instance, formic acid, which is sometimes used as a corrosion inhibitor intensifier, is limited by a temperature range in which it performs of from about 250° F. up to about 325° F. Potassium iodide is another intensifier that is sometimes used. It also has temperature limitations of about 325° F. that limit its usefulness. Additionally, some intensifiers, such as antimony-based intensifiers, can be used in conjunction with 15% HCl, but not with stronger acids such as 28% HCl. Another intensifier, cuprous iodide, is an effective up to about 350° F., however it has limited solubility in acid solutions. Additionally, cuprous iodide contains copper which is a banned in some areas due to environmental considerations.

SUMMARY

The present invention relates to methods and compositions for treating subterranean formations. More particularly, the present invention relates to corrosion inhibitor intensifier compositions that may be useful, inter alia, for enhancing the inhibition of metal corrosion in acidic environments, especially those encountered in subterranean operations such as hydrocarbon recovery, and associated methods of use.

In one embodiment, the present invention provides a method comprising: providing a metal surface within a well bore that penetrates a subterranean formation; and contacting the metal surface with a treatment fluid comprising an aqueous base fluid, an acid, a corrosion inhibitor, and a corrosion inhibitor intensifier composition comprising a corrosion inhibitor compound that corresponds to a formula: PR1R2R3, wherein R1, R2, and R3 are chosen from the group consisting of $C_1$-$C_{20}$ alkyl, cycloalkyl, oxyalkyl, and aryl groups, and R1, R2, and R3 may or may not be equal.

In another embodiment, the present invention provides a method comprising: providing a metal surface; and contacting the metal surface with a treatment fluid comprising an aqueous base fluid, an acid, a corrosion inhibitor, and a corrosion inhibitor intensifier composition comprising a corrosion inhibitor compound that corresponds to a formula: PR1R2R3, wherein R1, R2, and R3 are chosen from the group consisting of $C_1$-$C_{20}$ alkyl, cycloalkyl, oxyalkyl, and aryl groups, and R1, R2, and R3 may or may not be equal.

In another embodiment, the present invention provides a method comprising: providing an acidic fluid that comprises a corrosion inhibitor, and a corrosion inhibitor intensifier composition comprising a corrosion inhibitor compound that corresponds to a formula: PR1R2R3, wherein R1, R2, and R3 are chosen from the group consisting of $C_1$-$C_{20}$ alkyl, cycloalkyl, oxyalkyl, and aryl groups, and R1, R2, and R3 may or may not be equal; and contacting a metal surface with the corrosion inhibitor composition whereby the corrosion inhibitor intensifier enhances the effectiveness of the corrosion inhibitor over the effectiveness of the corrosion inhibitor alone.

The features and advantages of the present invention will be readily apparent to those skilled in the art. While numerous changes may be made by those skilled in the art, such changes are within the spirit of the invention.

DESCRIPTION OF PREFERRED EMBODIMENTS

The present invention relates to methods and compositions for treating subterranean formations. More particularly, the present invention relates to corrosion inhibitor intensifier compositions that may be useful, inter alia, for enhancing the inhibition of metal corrosion in acidic environments, especially those encountered in subterranean operations such as hydrocarbon recovery, and associated methods of use. The metal surfaces to be protected by the compositions of the present invention include any metal surface susceptible to corrosion in an acidic environment including, but not limited to, ferrous metals, low alloy metals (e.g., N-80 Grade), stainless steel (e.g., 13 Cr), copper alloys, brass, nickel alloys, and duplex stainless steel alloys. Such metal surfaces may be part of downhole piping, downhole tools, and the like.

One of the many advantages of the present invention is that the corrosion inhibitor intensifier compositions of the present invention may be more effective than corrosion inhibitors and intensifiers heretofore used and/or may possess desirable environmental properties for use in downhole environments in some areas, such as those that may be subject to more stringent environmental regulations. Another potential advantage of the corrosion inhibitor intensifier compositions of the present invention is that they may be more effective according to time and temperature over other intensifiers, and furthermore, they should not negatively impact foamability. In some embodiments, the corrosion inhibitor intensifier compositions of the present invention may be added directly to a corrosion inhibitor (e.g., in such a way that the intensifier composition becomes incorporated into the chemical formulation of the corrosion inhibitor), which can be added to an acidic fluid. This may be considered using the intensifier "internally." Alternatively, in other embodiments, the corrosion inhibitor intensifier compositions of the present invention may be added to an acidic fluid that comprises a corrosion inhibitor.

The corrosion inhibitor intensifier compositions of the present invention comprise a corrosion inhibitor compound that corresponds to a formula: $PR_1R_2R_3$, wherein $R_1$, $R_2$, and $R_3$ are chosen from the group consisting of $C_1$-$C_{20}$ alkyl, cylcoalkyl, oxyalkyl, and aryl groups, and $R_1$, $R_2$, and $R_3$ do not have to be equal. Some examples include triphenylphosphine ("TPP"), triethylphosphine, and trimethylphosphine. TPP is a preferred corrosion inhibitor compound. The compositions may include other intensifiers such as hexamethylenetratramine, if desired. Although not wanting to be limited by any theory in particular, when TPP is used, for example in preferred embodiments, it is presently believed that the TPP in the corrosion inhibitor intensifier compositions of the present invention may offer a different polymerization mechanism than other corrosion inhibitors. It is believed that the polymerization mechanism is a transition metal polymerization in which TPP acts as a ligand to polymerize the acid corrosion inhibitor on metal surfaces that may be present in the subterranean formation. This mechanism may be only pertinent if used with an inhibitor that has a polymerizable component. TPP will also work by itself, possibly either as a ligand to a metal surface directly or through attraction to the metal surface in the form of a protonated species. This same theory may apply to other embodiments disclosed herein.

The corrosion inhibitor intensifier compositions of the present invention are preferably used in conjunction with a corrosion inhibitor, but can be used without another corrosion inhibitor in milder temperatures (e.g., temperatures up to about 250° F.). The corrosion inhibitor intensifier compositions of the present invention may be present in a treatment fluid of the present invention in an amount in the range of from about 0.005% to about 5% by weight of the acid solution in the composition. Solubility may be a consideration in determining the amount to use. Also, if the intensifier composition is added internally to a corrosion inhibitor as described above, less may be used. More preferably, the intensifier is present in an amount in the range of from about 0.1% to about 1% by weight of the acid solution in the composition. If used by itself as a corrosion inhibitor, it should be used in an amount of about 0.1 to 5% by weight of the acid solution in the composition. The amount used may vary depending on the conditions present in the well bore, temperature, well bore contact time, solubility of the corrosion inhibitor compound in the acid present, the acid strength, the composition of the corrosion inhibitor compound, and other factors relevant to those skilled in the art.

The treatment fluids of the present invention comprise an aqueous base fluid, an acid, a corrosion inhibitor, and a corrosion inhibitor intensifier composition of the present invention.

The aqueous base fluids used in the treatment fluids of the present invention may comprise fresh water, saltwater (e.g., water containing one or more salts dissolved therein), brine, seawater, or combinations thereof. Generally, the water may be from any source, provided that it does not contain components that might adversely affect the stability and/or performance of the treatment fluids of the present invention. One of ordinary skill in the art, with the benefit of this disclosure, will recognize what components might adversely affect the stability and/or performance of the treatment fluids of the present invention.

The acid that may be present in the aqueous acidic solution of the present invention may comprise hydrochloric acid, hydrofluoric acid, acetic acid, formic acid, mixtures of these acids and the like. Blends of acids may be suitable. Organic and mineral acids also may be suitable. The present invention may be particularly effective with hydrochloric acid having a concentration in the aqueous fluid of about 5% by weight. Additionally, a variety of weak acids can be used in conjunction with the methods and compositions of the present invention. Examples of suitable weak acids include, but are not limited to, formic acid, acetic acid, citric acid, glycolic acid, hydroxyacetic acid, lactic acid, hydrofluoric acid, 3-hydroxypropionic acid, carbonic acid, and ethylenediaminetetraacetic acid. The acid may be present in an amount in the range of from about 1% by weight of the treatment fluid to the 30% by weight of the treatment fluid. The amount included may depend on the desired purpose or use for the treatment fluid. In certain embodiments, the acid may be present in an amount in the range of from about 5% by weight of the treatment fluid to 10% by weight of the treatment fluid. The amount of the acid(s) included in a particular treatment fluid of the present invention may depend upon the particular acid used, as well as other components of the treatment fluid, and/or other factors that will be recognized by one of ordinary skill in the art with the benefit of this disclosure.

The corrosion inhibitor may present in an amount effective to inhibit corrosion by the acid on the metal surfaces to be protected. Generally the corrosion inhibitor will be present in an amount of from about 0.05 to about 2% by weight based upon the weight of the treatment fluid.

The methods of the present invention can be carried out by blending the aqueous fluid with the acid to provide an acidic solution of a desired concentration. The corrosion inhibitor may then be blended with the solution in an amount sufficient to substantially reduce the corrosion rate of the acid on metal surfaces in contact or to be contacted with the acid. The amount of corrosion inhibitor utilized in the practice of the present invention can vary over a substantial range. Preferably, the inhibitor composition is present in an amount of from about 1 to about 30 gallons per 1000 gallons of aqueous acidic solution. The quantity of corrosion inhibitor will depend upon the concentration of the acid employed and the temperature at which the acidic solution will contact the metal surfaces.

Corrosion inhibitor compositions that may be useful in the present invention may comprise a cinnamaldehyde compound. The term "cinnamaldehyde compound" as used herein refers to cinnamaldehyde and cinnamaldehyde derivatives. Cinnamaldehyde derivatives may include any compound that may act as a source of cinnamaldehyde in mixtures encountered during use of the corrosion inhibitors. Examples of cinnamaldehyde derivatives suitable for use in the present invention include, but are not limited to, dicinnamaldehyde, p-hydroxycinnamaldehyde, p-methylcinnamaldehyde, p-ethylcinnamaldehyde, p-methoxycinnamaldehyde, p-dimethylaminocinnamaldehyde, p-diethylaminocinnamaldehyde, p-nitrocinnamaldehyde, o-nitrocinnamaldehyde, o-allyloxycinnamaldehyde, 4-(3-propenal)cinnamaldehyde, p-sodium sulfocinnamaldehyde, p-trimethylammoniumcinnamaldehyde sulfate, p-trimethylammoniumcinnamaldehyde, o-methylsulfate, p-thiocyanocinnamaldehyde, p-(S-acetyl)thiocinnamaldehyde, p-(S—N,N-dimethylcarbamoylthio)cinnamaldehyde, p-chlorocinnamaldehyde, α-methylcinnamaldehyde, β-methylcinnamaldehyde, α-chlorocinnamaldehyde, α-bromocinnamaldehyde, α-butylcinnamaldehyde, α-amylcinnamaldehyde, α-hexylcinnamaldehyde, α-bromo-p-cyanocinnamaldehyde, α-ethyl-p-methylcinnamaldehyde, p-methyl-α-pentylcinnamaldehyde, cinnamaloxime, cinnamonitrile, 5-phenyl-2,4-pentadienal, 7-phenyl-2,4,6-heptatrienal, and mixtures thereof.

The cinnamaldehyde compound may be present from about 0.005% to about 5% by weight of acid solution. In certain exemplary embodiments, the weight percent of the cinnamaldehyde compound may be present from about 0.02% to about 1% by weight of acid solution.

In certain embodiments, the corrosion inhibitor compositions useful in the present invention may comprise an acetylenic compound. The presence of an acetylenic compound is not necessary or essential in the present invention. Certain embodiments of the present invention may not include an acetylenic compound. Acetylenic compounds of the present invention may include acetylenic alcohols such as, for example, acetylenic compounds having the general formula: $R_1CCR_2R_3OH$ where $R_1$, $R_2$, and $R_3$ are hydrogen, alkyl, phenyl, substituted phenyl, or hydroxy-alkyl radicals. Preferably, $R_1$ comprises hydrogen. Preferably, $R_2$ comprises hydrogen, methyl, ethyl, or propyl radicals. Preferably, $R_3$ comprises an alkyl radical having the general formula $C_nH_{2n}$, where n is an integer from 1 to 10. The acetylenic compound $R_1CCR_2R_3OR_4$ may also be used where $R_4$ is a hydroxyalkyl radical. Examples of acetylenic alcohols suitable for use in the present invention include, but are not limited to, methyl butynol, methyl pentynol, hexynol, ethyl octynol, propargyl alcohol, benzylbutynol, ethynylcyclohexanol, ethoxy acetylenics, propoxy acetylenics, and mixtures thereof. Preferred alcohols are hexynol, propargyl alcohol, methyl butynol, ethyl octynol, propargyl alcohol ethoxylate (for example, Golpanol PME), propargyl alcohol propoxylate (for example, Golpanol PAP), and mixtures thereof. When used, the acetylenic compounds may be present in an amount from about 0.01% to about 10% by weight of acid solution. In certain embodiments, the addition of an acetylenic compound may be indicated at temperatures above 250° F. In certain exemplary embodiments, an acetylenic compound may be present in an amount from about 0.1% to about 1.5% by weight of acid solution.

In certain embodiments, corrosion inhibitor compositions useful in the present invention may optionally comprise a blend of a reaction product, as described in U.S. Pat. No. 5,366,643, hereby incorporated by reference. The reaction product is the product of the reaction of effective amounts of certain active hydrogen containing compounds with organic carbonyl compounds having at least one hydrogen atom on the carbon atom alpha to the carbonyl group and a fatty acid or other fatty compound or alkyl nitrogen heterocycles and preferably 2 or 4 alkyl substituted and an aldehyde, and particularly those aldehydes that may comprise aliphatic aldehydes containing from 1 to 16 carbon and aromatic aldehydes having no functional groups that are reactive under the reaction conditions other than aldehydes. The above ingredients may be reacted in the presence of an acid catalyst of sufficient strength to thereby form the reaction product.

A preferred method of preparing the reaction product employed in the inhibitor composition of the present invention is to react about 1 equivalent of active hydrogen compound and from about 0.5 to about 10 equivalent of aldehyde and from about 0.6 to about 10 equivalents of carbonyl compound and from about 0.8 to about 1.2 equivalents of mineral acid catalyst with from about 0.15 to about 10 equivalents of fatty compound at a temperature in the range of from about 140° F. to about 240° F. for a time in the range of from about 4 to 48 about hours. Upon completion of the reaction, additional fatty material may be added with stirring to bring the ratio of fatty material to a level of from about 2 to about 20 equivalents.

In some embodiments, the reaction product comprises in the range of from about 3% to about 75% by weight of the corrosion inhibitor composition. More preferably, the reaction product comprises from about 35% to about 70% by weight of the corrosion inhibitor composition.

The treatment fluids of the present invention optionally may include one or more of a variety of well-known additives, such as gel stabilizers, salts, fluid loss control additives, surfactants, solvents, scale inhibitors, organic corrosion inhibitors, catalysts, clay stabilizers, biocides, bactericides, friction reducers, gases, foaming agents, iron control agents, solubilizers, pH adjusting agents (e.g., buffers), and the like. Combinations of these may be used as well. Those of ordinary skill in the art, with the benefit of this disclosure, will be able to determine the appropriate additives for a particular application.

In some embodiments, the treatment fluids may be foamed. The corrosion inhibitor intensifier compositions of the present invention should not negatively impact the foamability of these fluids. Examples of foamed fracturing fluids that may be useful in conjunction with this invention are disclosed in U.S. Pat. No. 5,566,760, assigned to Halliburton Energy Services.

If desired, the treatment fluids of the present invention can be prepared in any suitable tank equipped with suitable mixing means well known to individuals skilled in the art. The fluids may be transferred either at a controlled rate directly into the well bore or into a convenient storage tank for injection down the well bore.

In some embodiments, the treatment fluid may be introduced into the subterranean formation whereby either foreign material in the well bore or in the formation or formation materials are dissolved to thereby increase the permeability of the formation (e.g., in an acidizing treatment). The increased permeability permits better flow of hydrocarbon fluids through the formation and into its well bore. The pumping rate and pressure utilized will depend upon the characteristics of the formation and whether or not fracturing of the formation is desired. After the treatment fluid has been placed in the formation, the well may be shut in and allowed to stand for a period of several hours or more depending on the type of acid employed and the formation treated. If there is pressure on the well, pressure then can be released and the spent or at least partially spent aqueous acidic solution, containing salts formed by the reaction of the acid, is permitted to flow back into the well bore and is pumped or flowed to the surface for appropriate disposal. The well then can be placed on production or used for other purposes.

Generally, some of the methods of the present invention involve inhibiting the corrosion of a portion of a surface in a subterranean formation. In one embodiment, the present invention provides a method of treating a subterranean formation penetrated by a well bore comprising the steps of: positioning within a well a metal surface exposable to a treatment fluid; introducing into the well and contacting the surface with a treatment fluid comprising an aqueous base fluid, an acid, a corrosion inhibitor, and a corrosion inhibitor intensifier composition comprising a corrosion inhibitor compound that corresponds to a formula: $PR_1R_2R_3$, wherein $R_1$, $R_2$, and $R_3$ are chosen from the group consisting of $C_1$-$C_{20}$ alkyl, cycloalkyl, oxyalkyl, and aryl groups, and $R_1$, $R_2$, and $R_3$ do not have to be equal; and contacting the surface with said aqueous acidic fluid, corrosion inhibitor and corrosion inhibitor intensifier. The corrosion inhibitor is an optional component in such methods.

In another embodiment, the present invention provides a method of inhibiting corrosion of a metal surface in contact with an acidic fluid comprising the steps of: introducing into an acidic fluid a corrosion inhibitor composition comprising a corrosion inhibitor, and a corrosion inhibitor intensifier composition comprising a corrosion inhibitor compound that corresponds to a formula: $PR_1R_2R_3$, wherein $R_1$, $R_2$, and $R_3$ are chosen from the group consisting of $C_1$-$C_{20}$ alkyl, cycloalkyl, oxyalkyl, and aryl groups, and $R_1$, $R_2$, and $R_3$ do not have to be equal; and contacting the metal surface with the corrosion inhibitor composition whereby the corrosion inhibitor intensifier enhances the effectiveness of the corrosion inhibitor over the effectiveness of the corrosion inhibitor alone. The corrosion inhibitor is an optional component in such methods.

To facilitate a better understanding of the present invention, the following examples of certain aspects of some embodiments are given. In no way should the following examples be read to limit, or define, the entire scope of the invention.

EXAMPLES

Table 1 lists data from experiments performed to determine the effect of triphenylphosphine in combination with HAI-303 corrosion inhibitor on N-80 steel. The corrosion loss limit for acceptability is 0.05 lb/ft$^2$. In both 15% and 28% HCl acids, intensification of the corrosion inhibition seems apparent. Other phosphite or phosphonium compounds also acted as intensifiers, but they did not appear to be as effective as triphenylphosphine.

The corrosion loss data were generated for N-80 steel using a weight loss method. Coupon specimens (~4.4 in$^2$) were cleaned and weighed prior to their immersion in 100 mL of the indicated acid blended with additives. Autoclaves containing the test fluids with the alloy specimens were pressurized to 1000 psi and then heated to test temperature for the contact time indicated. Following the test, any residues were cleaned from the specimens and the difference in weight was recorded and converted to pounds per square foot losses. "HAI-303" (a cinnamaldehyde-based) corrosion inhibitor and "HII-600" (a bismuth-based) intensifier are commercially available through Halliburton Energy Services, in Duncan, Okla.

TABLE 1

| Temp °F. | % Acid | Time (hours) | Coupon | % HAI-303 (v/v) | Additive | Concentration | Additive | Concentration | Corrosion Loss (lb/ft$^2$) |
|---|---|---|---|---|---|---|---|---|---|
| 300 | 15 | 3 | N80 | 2 | — | — | — | — | 0.195 |
| 300 | 15 | 3 | N80 | 2 | TPP | 25#/Mgal | — | — | 0.098 |
| 300 | 15 | 3 | N80 | 2 | TPP | 50#/Mgal | — | — | 0.065 |
| 300 | 15 | 3 | N80 | 2 | P(OMe)$_3$ | 1% (v/v) | — | — | 0.235 |
| 300 | 15 | 3 | N80 | 2 | PPh$_4$Cl | 25#/Mgal | — | — | 0.131 |
| 300 | 15 | 3 | N80 | 2 | PPh$_4$Cl | 50#/Mgal | — | — | 0.096 |
| 300 | 7 | 8 | N80 | 3 | TPP | 25#/Mgal | HII-600 | 0.1% (v/v) | 0.057 |
| 300 | 7 | 8 | N80 | 2 | TPP | 25#/Mgal | HII-600 | 0.1% (v/v) | 0.077 |
| 300 | 7 | 8 | N80 | 2 | TPP | 25#/Mgal | HII-600/KI | 0.1/10#/Mgal | 0.038 |
| 300 | 7 | 8 | N80 | 2 | TPP | 25#/Mgal | HII-600 | 0.05% (v/v) | 0.050 |

TABLE 1-continued

| Temp °F. | % Acid | Time (hours) | Coupon | % HAI-303 (v/v) | Additive | Concentration | Additive | Concentration | Corrosion Loss (lb/ft$^2$) |
|---|---|---|---|---|---|---|---|---|---|
| 300 | 7 | 8 | N80 | 2 | — | — | HII-600 | 0.05% (v/v) | 0.126 |
| 225 | 28 | 3 | N80 | 2 | — | — | — | — | 0.204 |
| 225 | 28 | 3 | N80 | 2 | Hexamine | 25#/Mgal | — | — | 0.176 |
| 225 | 28 | 3 | N80 | 2 | TPP | 25#/Mgal | — | — | 0.015 |
| 225 | 28 | 3 | N80 | 2 | 88% Formic Acid | 4% (v/v) | — | — | 0.051 |
| 225 | 28 | 3 | N80 | 2 | KI | 30#/Mgal | — | — | 0.136 |
| 225 | 28 | 3 | N80 | 2 | KI | 30#/Mgal | 88% Formic Acid | 4% (v/v) | 0.252 |
| 250 | 28 | 3 | N80 | 2 | TPP | 50#/Mgal | — | — | 0.037 |

In another experiment, triphenylphosphine was tested as an intensifier and we found that it could both inhibit corrosion in conjunction with another corrosion inhibitor and maintain foamability in foams. Foam tests were run by blending the acid (200 ml) on high speed in a Waring blender for 1 min. The acid contained 1% by volume "HC-2" foamer (which is commercially available through Halliburton Energy Services, in Duncan, Okla.). A stable foam was indicated by approximately 100 ml or less fluid breakout over 10 min. With triphenylphosphine, 910 ml foam was obtained after mixing. With CuCl/KI, only 400 ml was obtained. Table 2 illustrates the results.

TABLE 2

| Temp °F. | % Acid | Time (hours) | Coupon | % HAI-303 | Additive | Concentration | Additive | Concentration | Corrosion Loss (lb/ft$^2$) | Foam Stable? |
|---|---|---|---|---|---|---|---|---|---|---|
| 250 | 28 | 3 | N80 | 2 | TPP | 50#/Mgal | — | — | 0.037 | Yes |
| 250 | 28 | 3 | N80 | 2 | CuCl | 5#/Mgal | KI | 11#/Mgal | 0.060 | No |

Another experiment was performed to explore the performance of an organic acid inhibitor with TPP. In these experiments, the TPP intensifier composition was mixed into the neat inhibitor before addition to the acid blend. "MSA-III" is a commercially available organic acid corrosion inhibitor from Halliburton Energy Services, Duncan, Okla. Table 3 lists these results.

TABLE 3

| Temp °F. | % Acid | Time (hours) | Coupon | % MSA-III | Additive | Concentration | Corrosion Loss (lb/ft$^2$) |
|---|---|---|---|---|---|---|---|
| 350 | 10% formic | 24 | N80 | 2 | TPP | 0.24 wt/v % | 0.079 |
| 350 | 10% formic | 24 | N80 | 2 | None | — | 0.131 |

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. In particular, every range of values (of the form, "from about a to about b," or, equivalently, "from approximately a to b," or, equivalently, "from approximately a-b") disclosed herein is to be understood as referring to the power set (the set of all subsets) of the respective range of values, and set forth every range encompassed within the broader range of values. Also, the terms in the claims have their plain, ordinary meaning unless otherwise explicitly and clearly defined by the patentee.

What is claimed is:

1. A method comprising:
providing a metal surface within a well bore that penetrates a subterranean formation; and
contacting the metal surface with a treatment fluid comprising an aqueous base fluid, an acid, a corrosion inhibitor, and a corrosion inhibitor intensifier composition comprising a surface active corrosion inhibitor compound that corresponds to a formula: $PR_1R_2R_3$, wherein $R_1$, $R_2$, and $R_3$ are chosen from the group consisting of $C_1$-$C_{20}$ alkyl, cycloalkyl, oxyalkyl, and aryl groups, and $R_1$, $R_2$, and $R_3$ may or may not be equal; wherein the corrosion inhibitor is selected from the group consisting of: an acetylenic compound, cinnamaldehyde; dicinnamaldehyde; p-hydroxycinnamaldehyde; p-methylcinnamaldehyde; p-ethylcinnamaldehyde; p-methoxycinnamaldehyde; p-dimethylaminocinnamaldehyde;

p-diethylaminocinnamaldehyde; p-nitrocinnamaldehyde; o-nitrocinnamaldehyde; o-allyloxycinnamaldehyde; 4-(3-propenal)cinnamaldehyde; p-sodium sulfocinnamaldehyde; p-trimethylammoniumcinnamaldehyde sulfate; p-trimethylammoniumcinnamaldehyde; o-methylsulfate; p-thiocyanocinnamaldehyde; p-(S-acetyl)thiocinnamaldehyde; p-(S-N,N-dimethylcarbamoylthio)cinnamaldehyde; p-chlorocinnamaldehyde; α-methylcinnamaldehyde; (β-methylcinnamaldehyde; α-chlorocinnamaldehyde; α-bromocinnamaldehyde; α-butylcinnamaldehyde; α-amylcinnamaldehyde; α-hexylcinnamaldehyde; α-bromo-p-cyanocinnamaldehyde; α-ethyl-p-methylcinnamaldehyde; p-methyl-α-pentylcinnamaldehyde; cinnamaloxime; cinnamonitrile; 5-phenyl-2,4-pentadienal; 7-phenyl-2,4,6-heptatrienal; and mixtures thereof; and, wherein corrosion of at least a portion of the metal surface is inhibited.

2. The method of claim 1 wherein the corrosion inhibitor intensifier composition is triphenylphosphine, triethylphosphine, or trimethylphosphine.

3. The method of claim 1 wherein the concentration of the corrosion inhibitor is about zero.

4. The method of claim 1 wherein the acid comprises one of the following acids selected from the group consisting of: hydrochloric acid; hydrofluoric acid; acetic acid; formic acid; organic acids; mineral acids; formic acid; acetic acid; citric acid; glycolic acid; hydroxyacetic acid; lactic acid; hydrofluoric acid; 3-hydroxypropionic acid; carbonic acid; ethylenediaminetetraacetic acid; mixtures of these acids; and blends of these acids.

5. The method of claim 1 wherein the corrosion inhibitor comprises a blend of a reaction product that is the product of a reaction of effective amounts of an active hydrogen containing compound with an organic carbonyl compound having at least one hydrogen atom on the carbon atom alpha to the carbonyl group and a fatty acid or other fatty compound or alkyl nitrogen heterocycles and preferably 2 or 4 alkyl substituted and an aldehyde.

6. The method of claim 1 wherein the treatment fluid comprises an additive chosen from the group consisting of: gel stabilizers; salts; fluid loss control additives; surfactants; solvents; scale inhibitors; organic corrosion inhibitors; catalysts; clay stabilizers; biocides; bactericides; friction reducers; gases; foaming agents; iron control agents; solubilizers; pH adjusting agents; buffers; and combinations thereof.

7. The method of claim 1 wherein the treatment fluid is foamed.

8. The method of claim 1 wherein the treatment fluid is introduced into the subterranean formation as part of an acidizing treatment.

9. A method comprising:
providing a metal surface; and
contacting the metal surface with a treatment fluid comprising an aqueous base fluid, an acid, a corrosion inhibitor, and a corrosion inhibitor intensifier composition comprising a surface active corrosion inhibitor compound that corresponds to a formula: $PR_1R_2R_3$, wherein $R_1$, $R_2$, and $R_3$ are chosen from the group consisting of $C_1$-$C_{20}$ alkyl, cycloalkyl, oxyalkyl, and aryl groups, and $R_1$, $R_2$, and $R_3$ may or may not be equal; wherein the corrosion inhibitor is selected from the group consisting of: an acetylenic compound, cinnamaldehyde; dicinnamaldehyde; p-hydroxycinnamaldehyde; p-methylcinnamaldehyde; p-ethylcinnamaldehyde; p-methoxycinnamaldehyde; p-dimethylaminocinnamaldehyde; p-diethylaminocinnamaldehyde; p-nitrocinnamaldehyde; o-nitrocinnamaldehyde; o-allyloxycinnamaldehyde; 4-(3-propenal)cinnamaldehyde; p-sodium sulfocinnamaldehyde; p-trimethylammoniumcinnamaldehyde sulfate; p-trimethylammoniumcinnamaldehyde; o-methylsulfate; p-thiocyanocinnamaldehyde; p-(S-acetyl)thiocinnamaldehyde; p-(S—N,N-dimethylcarbamoylthio)cinnamaldehyde; p-chlorocinnamaldehyde; α-methylcinnamaldehyde; (β-methylcinnamaldehyde; α-chlorocinnamaldehyde; α-bromocinnamaldehyde; α-butylcinnamaldehyde; α-amylcinnamaldehyde; α-hexylcinnamaldehyde; α-bromo-p-cyanocinnamaldehyde; α-ethyl-p-methylcinnamaldehyde; p-methyl-α-pentylcinnamaldehyde; cinnamaloxime; cinnamonitrile; 5-phenyl-2,4-pentadienal; 7-phenyl-2,4,6-heptatrienal; and mixtures thereof; and, wherein corrosion of at least a portion of the metal surface is inhibited.

10. The method of claim 9 wherein the corrosion inhibitor intensifier composition is triphenylphosphine, triethylphosphine, or trimethylphosphine.

11. The method of claim 9 wherein the concentration of the corrosion inhibitor is about zero.

12. The method of claim 9 wherein the acid comprises one of the following acids selected from the group consisting of: hydrochloric acid; hydrofluoric acid; acetic acid; formic acid; organic acids; mineral acids; formic acid; acetic acid; citric acid; glycolic acid; hydroxyacetic acid; lactic acid; hydrofluoric acid; 3-hydroxypropionic acid; carbonic acid; ethylenediaminetetraacetic acid; mixtures of these acids; and blends of these acids.

13. The method of claim 9 wherein the corrosion inhibitor comprises a blend of a reaction product that is the product of a reaction of effective amounts of an active hydrogen containing compound with an organic carbonyl compound having at least one hydrogen atom on the carbon atom alpha to the carbonyl group and a fatty acid or other fatty compound or alkyl nitrogen heterocycles and preferably 2 or 4 alkyl substituted and an aldehyde.

14. The method of claim 9 wherein the treatment fluid comprises an additive chosen from the group consisting of: gel stabilizers; salts; fluid loss control additives; surfactants; solvents; scale inhibitors; organic corrosion inhibitors; catalysts; clay stabilizers; biocides; bactericides; friction reducers; gases; foaming agents; iron control agents; solubilizers; pH adjusting agents; buffers; and combinations thereof.

15. A method comprising:
providing an acidic fluid that comprises a corrosion inhibitor, and a corrosion inhibitor intensifier composition comprising a surface active corrosion inhibitor compound that corresponds to a formula: $PR_1R_2R_3$, wherein $R_1$, $R_2$, and $R_3$ are chosen from the group consisting of $C_1$-$C_{20}$ alkyl, cycloalkyl, oxyalkyl, and aryl groups, and $R_1$, $R_2$, and $R_3$ may or may not be equal; and, wherein the corrosion inhibitor is selected from the group consisting of selected from the group consisting of: an acetylenic compound, cinnamaldehyde; dicinnamaldehyde; p-hydroxycinnamaldehyde; p-methylcinnamaldehyde; p-ethylcinnamaldehyde; p-methoxycinnamaldehyde; p-dimethylaminocinnamaldehyde; p-diethylaminocinnamaldehyde; p-nitrocinnamaldehyde; o-nitrocinnamaldehyde; o-allyloxycinnamaldehyde; 4-(3-propenal) cinnamaldehyde; p-sodium sulfocinnamaldehyde; p-trimethylammoniumcinnamaldehyde sulfate; p-trimethylammoniumcinnamaldehyde; o-methylsulfate; p-thiocyanocinnamaldehyde; p-(S-acetyl)thiocinnamaldehyde; p-(S—N,N-dimethylcarbamoylthio)cinnamaldehyde; p-chlorocinnamaldehyde; α-methylcinnamaldehyde; (β-methylcinnamaldehyde; α-chlorocinnamaldehyde; α-bromocinnamaldehyde; α-butylcinnamaldehyde; α-amylcinnamaldehyde; α-hexylcinnamaldehyde; α-bromo-p-cyanocinnamaldehyde; α-ethyl-p-methylcinnamaldehyde; p-methyl-α-pentylcinnamaldehyde; cinnamaloxime; cinnamonitrile; 5-phenyl-2,4-pentadienal; 7-phenyl-2,4,6-heptatrienal; and mixtures thereof; and, contacting a metal surface within a wellbore with the surface active corrosion inhibitor composition whereby the corrosion inhibitor intensifier enhances the effectiveness of the corrosion inhibitor over the effectiveness of the corrosion inhibitor alone and wherein corrosion of at least a portion of the metal surface is inhibited.

16. The method of claim 15 wherein the corrosion inhibitor intensifier composition compound is triphenylphosphine, triethylphosphine, or trimethylphosphine.

17. The method of claim 1 wherein the acid comprises one of the following acids selected from the group consisting of: hydrochloric acid; hydrofluoric acid; acetic acid; formic acid; organic acids; mineral acids; formic acid; acetic acid; citric acid; glycolic acid; hydroxyacetic acid; lactic acid; hydrofluoric acid; 3-hydroxypropionic acid; carbonic acid; ethylenediaminetetraacetic acid; mixtures of these acids; and blends of these acids.

18. The method of claim 15 wherein the treatment fluid comprises an additive chosen from the group consisting of: gel stabilizers; salts; fluid loss control additives; surfactants; solvents; scale inhibitors; organic corrosion inhibitors; catalysts; clay stabilizers; biocides; bactericides; friction reducers; gases; foaming agents; iron control agents; solubilizers; pH adjusting agents; buffers; and combinations thereof.

19. The method of claim 15 wherein the acidic fluid is foamed.

* * * * *